April 24, 1951    J. F. BYRNE ET AL    2,550,452
COMPOUND DIELECTRIC MATERIALS
Filed March 7, 1945

CONTAINING
COMPOSITE SOLID
AND LIQUID
DIELECTRIC MATERIAL

Inventors:
John F. Byrne,
Frank M. Clark,
by Harry E. Dunham
Their Attorney.

Patented Apr. 24, 1951

2,550,452

UNITED STATES PATENT OFFICE 2,550,452

COMPOUND DIELECTRIC MATERIALS

John F. Byrne and Frank M. Clark, Pittsfield, Mass., assignors to General Electric Company, a corporation of New York Application March 7, 1945, Serial No. 581,444

7 Claims. (Cl. 175—41)

The present invention comprises improved electric capacitors which, although suitable for general use, are adapted particularly well for the high frequency field.

It is one of the objects of our invention to provide capacitors which have a high degree of efficiency and stability over a wide range of frequencies, that is, from ordinary commercial low frequencies upward to frequencies as high as 20 megacycles, or even higher, and which also are stable over a range of operating temperatures. It is also an object of our invention to provide capacitors, the operation of which is accompanied by low internal energy losses, that is, to provide capacitors which operate with low power factor.

It is a further object of our invention to provide capacitors which are capable of being operated over a wide range of temperatures at a given frequency with little or no change in operating characteristics.

Capacitors embodying our invention are provided with a composite dielectric comprising an intimate mixture of a compacted mass of finely divided magnesia or alumina and a liquid dielectric material of low viscosity, such as will be described.

Figure 1:
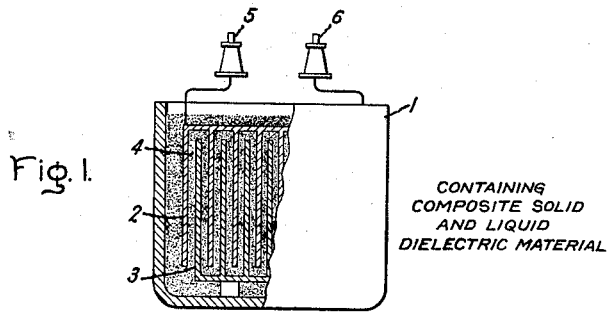
Figure 2:
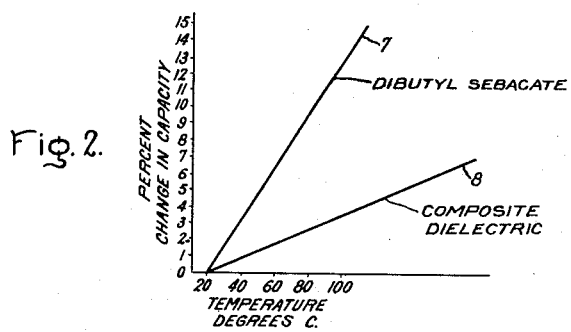
Figure 3:
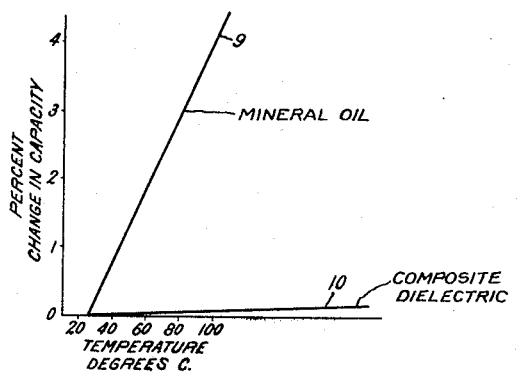
Figure 4:
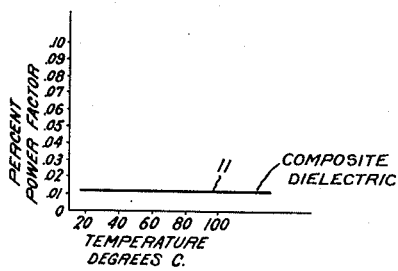

An embodiment of our invention is shown in the accompanying drawing in which Fig. 1 is a conventional vertical section of a capacitor embodying our invention; Figs. 2 and 3 are graphs showing the reduction in change of capacity due to rise of temperature in capacitors embodying our invention as compared with capacitors unprovided with a finely divided solid material; and Fig. 4 is a graph showing the low and substantially constant power factor measured at high frequency over a range of temperatures of capacitors embodying our invention.

For the liquid ingredient of our composite dielectric material, we prefer to employ liquid dielectric materials having a viscosity not substantially greater than about 100 seconds Saybolt Universal at 37.8° C. (100° F.). The following are examples of suitable low viscosity liquids, but our invention is not limited to those enumerated: Petroleum hydrocarbons, liquid organic compounds preferably alkyl esters of aliphatic acid and including halogenated hydrocarbons, such as chlorinated compounds of benzene, ethyl benzene, toluene, xylene, and other aryl compounds; also fluorinated compounds such as trichlor benzo trifluoride; and chlorinated esters such as chlorinated amyl benzoate and chlorinated benzyl sebacate.

In general, the dielectric strength of a solid dielectric varies inversely with approximately the .137 power of the frequency of an impressed variable electric field (Montsinger AIEE Transactions 43 (1924) 337–347). An example of a composite dielectric subject to a marked reduction in dielectric strength in high frequency fields is polystyrene. As will be shown later, this rule of inverse change of dielectric strength with frequency does not apply to the composite dielectric materials embodying our invention.

Referring to Fig. 1, the capacitor there shown comprises a container 1 in which are located armatures 2, 3 which are spaced apart mechanically without intervening septa other than the filling 4 of comminuted and liquid material. Terminals 5, 6 connected to the armatures 2, 3 are provided as usual. The liquid material wets and fills the minute interstitial spaces of the finely divided and compacted solid.

It is preferable ordinarily to insure maximum stability that the comminuted solid material should be tightly packed, or, in other words, should assume from the start its maximum density. In order to determine this condition, it is customary to determine the density assumed by jarring or bumping the comminuted material. For example, the ultimate or real density of magnesia as given in standard tables is about 3.5 mixtures by weight of 65 parts of 80 mesh product and 35 parts of 300 mesh material, and also 60 parts 80 mesh, 15 parts 100 mesh and 25 parts 300 mesh material, will give a "bump density" of about 2.6. A bump density of granular magnesium oxide of 2.6 indicates a porosity of about 25 per cent.

The advantages of our invention may be illustrated by the improvement noted due to the presence of the comminuted solid material when the liquid component of the dielectric material consists of mineral oil chosen to have a viscosity of about 100 seconds Saybolt Universal at 37.3° C. Such an oil has a dielectric constant of 2.25 when measured at 500 kilocycles, 25° C. A composition prepared as above-described and consisting of magnesium oxide particles having a density of about 2.48 packed to a bump density of at least about 2.6 when saturated with mineral oil of this viscosity has at the same temperature and frequency a dielectric constant of about 6.5. The resulting increase in electrical capacity of a capacitor containing such a combination of a major amount of porous solid and a minor amount of liquid material over a similar capacitor containing only the liquid material is 190 per cent.

Similarly, dibutyl sebacate having a viscosity of about 100 seconds Saybolt Universal at 37.8° C. has a dielectric constant of 4.4 when measured at 500 kilocycles, 25° C. A dielectric consisting of compacted magnesium oxide having a mass density of 2.6 and saturated with dibutyl sebacate has a dielectric constant of 7.7. The increase in electrical capacity of the described composite dielectric over a dielectric consisting solely of dibutyl sebacate is about 77 per cent. The dielectric strength in kilovolts is but very slightly affected by the presence of magnesium oxide.

The dielectric strength is substantially constant over a temperature of about 25 to 100° C. for a composite dielectric consisting of magnesium oxide particles and mineral oil or dibutyl sebacate or other suitable liquid as described.

According to formulae commonly accepted by electrical engineers, a solid insulation of low loss characteristics which is suitable for use in high frequency capacitors will lose about 70 per cent of its dielectric strength value measured at 60 cycles when the frequency is raised to 500 kilocycles. Liquids such as used in high frequency capacitors have been found to be characterized by a loss of only about 40 per cent in dielectric strength when the impressed frequency is increased from about 60 cycles to 500 kilocycles. It is surprising that with the combination of solid and liquid dielectric materials combined as above-described the dielectric strength at high frequency is substantially that of the liquid component even though the liquid constitutes only about 25 per cent of the volume of the entire mass.

In high frequency capacitors to be used in radio-transmitting apparatus, it is desired that the electrical capacity of the unit shall be substantially unchanged as the temperature varies from about 25 to 100° C., or that in any event the change in capacity over this temperature range shall not be substantially more than .05 per cent. Capacitors prepared in accordance with our invention are characterized in their operation by a substantially constant capacity in this temperature range.

As shown in the graphs of Fig. 2, capacitors containing as dielectric material particles of magnesium oxide in combination with dibutyl sebacate operate with less change in capacity than similar capacitors in which the dielectric element consists solely of dibutyl sebacate, as the temperature is increased from 20° C. to 100° C., and higher temperatures. Graph 7 somewhat conventionally shows the rise in capacity characteristics of capacitors in which the dielectric element consists solely of dibutyl sebacate which at 100° F. (37.8° C.) is a liquid having a viscosity of about 46 seconds Saybolt Universal. As the temperature rises from about room temperature to 100° C., the capacity of capacitors containing such liquid as the dielectric element rises about 13 per cent. As shown by the graph 8, the capacity of a similar capacitor containing a compound dielectric embodying our invention increases only about 3.5 per cent over the same range of temperatures.

As shown in Fig. 3, the difference in behavior of similar capacitors, one containing mineral oil as the dielectric and the other a combination of magnesium oxide and mineral oil over such a range of temperatures, is more marked. Graph 9 shows the increase of capacity of capacitors in which mineral oil of 100 seconds Saybolt Universal viscosity at 37.8° C. to be about 4 per cent as the temperature rises from 20° to 100° C. When the dielectric material consists of magnesium oxide and such oil, the rise of capacity is too small to be readily shown on the same scale, but is visually indicated by the graph 10.

At 50° C., the rise of capacity is only 0.015 per cent. At 75° C. it is 0.03 per cent. At 100° C. the capacity increase is 0.046 per cent. For most practical purposes, the capacity of capacitors containing a dielectric material consisting of about 75 per cent magnesium oxide and 25 per cent mineral oil of low viscosity is substantially constant over a temperature range of 20 to 100° C.

The graph 11 of Fig. 4 illustrates visually the low and substantially constant power factor of about .01 over a temperature range of 20° to 100° C. of capacitors containing a compound dielectric material consisting of particles of magnesium oxide and dibutyl sebacate when measured over the frequency range from 100 to 1000 kilocycles. Similar low and constant power factor characteristics over the frequency range from 100 to 1000 kilocycles and even higher are obtained when mineral oil and other low viscosity liquids are substituted for dibutyl sebacate.

A composite dielectric prepared in accordance with our invention in which the compacted finely divided material consists of alumina, $Al_2O_3$, saturated with dibutyl sebacate has a dielectric constant of 5.7 when measured at room temperature at a frequency of 500 kilocycles. The power factor of such dielectric is only very slightly higher than that of the described composite dielectric comprising magnesium oxide and low viscosity liquid, and shows the same substantial constancy of capacity over the temperature range of 25 to 100° C.

What we claim as new and desire to secure by Letters Patent of the United States is:

1. A dielectric composition which is suitable for use in capacitors comprising the combination of a compact mass of discrete oxide particles chosen from the group consisting of magnesium oxide and aluminum oxide and a liquid dielectric material having a viscosity not materially exceeding 100 seconds Saybolt at 37.8° C. filling the voids in said mass.

2. A dielectric composition which is suitable for use in capacitors comprising the combination of a compact body of discrete particles of magnesium oxide, said body having a mass density of at least about 2.6 and a dielectric liquid having a viscosity not materially exceeding about 100 seconds Saybolt Universal at 37.8° C. saturating said body.

3. A dielectric composition for capacitor use in the high frequency field comprising the combination of a compacted mass of discrete magnesium oxide particles and a lesser amount of liquid dibutyl sebacate filling the voids therein.

4. A dielectric composition for capacitor use in the high frequency field comprising the combination of a compacted mass of discrete magnesium oxide particles and a lesser amount of mineral oil having a viscosity of about 100 seconds Saybolt Universal at 37.8° C. filling the voids therein.

5. A capacitor suitable for use in the high frequency field comprising a container, spaced aluminum armatures therein, a compact mass of discrete particles of oxide therebetween, said particles being chosen from the group consisting of magnesium oxide and aluminum oxide and being compacted to result in a porosity in the mass of about 25 per cent, and a liquid dielectric material filling the voids in said mass, said material having a viscosity not materially greater than about 100 seconds Saybolt Universal at 37.8° C.

6. A capacitor suitable for use in the high frequency field comprising the combination of a container, spaced armatures therein, a compacted mass therebetween consisting of discrete particles of magnesium oxide and dibutyl sebacate filling the voids in said mass.

7. A capacitor dielectric element comprising the combination of a compact porous mass of discrete magnesium oxide particles, said mass having a density of about 2.6 and mineral oil having a viscosity not exceeding about 100 seconds Saybolt at 37.8° C. saturating said mass, such oxide constituting about 75 per cent of the dielectric element.

JOHN F. BYRNE.
FRANK M. CLARK.

REFERENCES CITED

The following references are of record in the file of this patent:

UNITED STATES PATENTS

| Number | Name | Date |
|---|---|---|
| 1,751,939 | Meissner | Mar. 25, 1930 |
| 1,895,376 | Clark | Jan. 24, 1933 |
| 1,947,112 | Ruben | Feb. 13, 1934 |
| 2,036,274 | Holler | Apr. 7, 1936 |
| 2,111,414 | Work | Mar. 15, 1938 |
| 2,428,608 | Bass | Oct. 7, 1947 |
| 2,449,051 | Breth | Sept. 14, 1948 |

FOREIGN PATENTS

| Number | Country | Date |
|---|---|---|
| 610,138 | France | Jan. 27, 1926 |
| 471,176 | Great Britain | Aug. 30, 1937 |

OTHER REFERENCES

"Solvents," 1939 catalog of the Commercial Solvents Corp., pages 44 and 45.

"Dielectric Constant and Molecular Structure," Smyth, page 205.

Fire Resistant Duck by J. R. Redmond in Amer. Dyestuff Reporter, Aug. 30, 1943, page 376.

Electrical Insulating Material by Warren, pages 437, 186.